US012387023B2

(12) United States Patent
Li et al.

(10) Patent No.: US 12,387,023 B2
(45) Date of Patent: Aug. 12, 2025

(54) CHIP POWER CONSUMPTION ANALYZER AND ANALYZING METHOD THEREOF

(71) Applicants: Global Unichip Corporation, Hsinchu (TW); Taiwan Semiconductor Manufacturing Company, Ltd., Hsinchu (TW)

(72) Inventors: Sin-Huei Li, Hsinchu (TW); Cheng-Hong Tsai, Hsinchu (TW); Chien-Cheng Wu, Hsinchu (TW); Yen-Chih Chiu, Hsinchu (TW); Hu-Cheng Jiang, Hsinchu (TW)

(73) Assignees: Global Unichip Corporation, Hsinchu (TW); Taiwan Semiconductor Manufacturing Company, Ltd., Hsinchu (TW)

( * ) Notice: Subject to any disclaimer, the term of this patent is extended or adjusted under 35 U.S.C. 154(b) by 697 days.

(21) Appl. No.: 17/829,376

(22) Filed: Jun. 1, 2022

(65) Prior Publication Data

US 2023/0342529 A1    Oct. 26, 2023

(30) Foreign Application Priority Data

Apr. 22, 2022    (TW) .................................. 111115334

(51) Int. Cl.
  *G06F 30/3312*  (2020.01)
  *G06F 119/06*  (2020.01)
  *G06F 119/12*  (2020.01)

(52) U.S. Cl.
  CPC ...... *G06F 30/3312* (2020.01); *G06F 2119/06* (2020.01); *G06F 2119/12* (2020.01)

(58) Field of Classification Search
  USPC ........................................................ 716/113
  See application file for complete search history.

(56) References Cited

U.S. PATENT DOCUMENTS

| 2004/0030511 | A1  | 2/2004  | Tien et al. |
| 2004/0201365 | A1* | 10/2004 | Dasgupta ................ B60L 58/20 |
|              |     |         | 320/116 |

(Continued)

FOREIGN PATENT DOCUMENTS

| CN | 1949230   | 4/2007 |
| CN | 113408226 | 9/2021 |

(Continued)

OTHER PUBLICATIONS

"Office Action of Taiwan Counterpart Application", issued on Jan. 31, 2023, p. 1-p. 6.

*Primary Examiner* — Mohammed Alam
(74) *Attorney, Agent, or Firm* — JCIPRNET

(57) ABSTRACT

Disclosed are a chip power consumption analyzer and an analyzation method thereof. The analyzation method includes the following. Design information of a circuit is received. A plurality of clock arriving times of a plurality of circuit cells in the circuit are calculated based on the design information, and a base cell type is set among a plurality of cell types according to the clock arriving times. Base demand current information of the base cell type is established, and a plurality of demand current information of the circuit cells is obtained. A plurality of demand peak currents of a plurality of bump current sources are predicted according to the demand current information and a plurality of position information of the circuit cells.

12 Claims, 12 Drawing Sheets

(56) References Cited

U.S. PATENT DOCUMENTS

| | | | |
|---|---|---|---|
| 2005/0010883 A1* | 1/2005 | Wood | G06F 30/39 |
| | | | 716/113 |
| 2012/0017198 A1* | 1/2012 | Ng | G06F 30/327 |
| | | | 716/120 |
| 2012/0198410 A1* | 8/2012 | Boyle | G06F 30/367 |
| | | | 716/134 |
| 2013/0339917 A1* | 12/2013 | Darringer | G06F 30/392 |
| | | | 716/120 |
| 2014/0113171 A1* | 4/2014 | Schaefer | H01M 10/6555 |
| | | | 165/185 |
| 2015/0104677 A1* | 4/2015 | Koh | H01M 10/425 |
| | | | 429/7 |
| 2021/0320385 A1* | 10/2021 | Kim | H01M 50/284 |
| 2022/0352589 A1* | 11/2022 | Park | H01M 50/24 |
| 2023/0282925 A1* | 9/2023 | Jang | H01M 50/291 |
| | | | 429/159 |
| 2023/0342529 A1* | 10/2023 | Li | G06F 30/3312 |

FOREIGN PATENT DOCUMENTS

| | | | | |
|---|---|---|---|---|
| CN | 114287083 A | * | 4/2022 | H01M 10/613 |
| TW | I251171 | | 3/2006 | |

* cited by examiner

| | | First threshold voltage | | | | | Second threshold voltage | | | | |
|---|---|---|---|---|---|---|---|---|---|---|---|
| Threshold voltage | Driving capability | 1 | 2 | 4 | 6 | 8 | 1 | 2 | 4 | 6 | 8 |
| Single-bit | 2 | 7368 | 269 | 14 | 0 | 1 | 8334 | 795 | 260 | 6 | 8 |
| Multi-bit | 4 | 130 | 3 | 0 | 0 | 0 | 193 | 27 | 0 | 0 | 107 |
| | 6 | 45 | 10 | 0 | 0 | 0 | 206 | 5 | 0 | 0 | 0 |
| | 6 | 94 | 171 | 0 | 0 | 0 | 212 | 264 | 0 | 0 | 0 |
| | 8 | 2987 | 350 | 0 | 0 | 0 | 2400 | 578 | 0 | 0 | 0 |

410 (marker pointing to 7368)

FIG. 4

| Cell type | | First threshold voltage | | Second threshold voltage | |
|---|---|---|---|---|---|
| | | CP | Q | CP | Q |
| Single-bit | Cell type 1 | Base | Base | 1.32 | 1.33 |
| Multi-bit | Cell type 2 | 1.00 | 1.73 | 1.32 | 2.24 |
| | Cell type 3 | 1.19 | 2.99 | 1.54 | 3.79 |
| | Cell type 4 | 1.30 | 5.06 | 1.66 | 6.45 |
| | Cell type 5 | 0.99 | 1.51 | 1.25 | 1.98 |
| | Cell type 6 | 0.99 | 2.46 | 1.25 | 3.24 |
| | Cell type 7 | 0.99 | 2.12 | 1.25 | 2.73 |
| | Cell type 8 | 0.99 | 3.84 | 1.25 | 4.96 |
| | ⋮ | | | | |

FIG. 5

| Bump current source | Register density | Toggle rate / Demand current information | | |
|---|---|---|---|---|
| | | 50 | 33 | 25 |
| | | 3.6533 | 2.7474 | 2.3732 |
| | | Predicted demand peak current | | |
| B1 | 0.1791 | 0.654 | 0.492 | 0.425 |
| B2 | 0.178 | 0.650 | 0.489 | 0.422 |
| B3 | 0.1776 | 0.649 | 0.488 | 0.421 |
| B4 | 0.177 | 0.647 | 0.486 | 0.420 |
| B5 | 0.1763 | 0.644 | 0.484 | 0.418 |
| B6 | 0.1763 | 0.644 | 0.484 | 0.418 |

FIG. 8

CHIP POWER CONSUMPTION ANALYZER AND ANALYZING METHOD THEREOF

CROSS-REFERENCE TO RELATED APPLICATION

This application claims the priority benefit of Taiwanese application no. 111115334, filed on Apr. 22, 2022. The entirety of the above-mentioned patent application is hereby incorporated by reference herein and made a part of this specification.

BACKGROUND

Technical Field

The disclosure relates to a chip power consumption analyzer and an analysis method thereof. Particularly, the disclosure relates to a chip power consumption analyzer and an analysis method thereof that reduce analysis time.

Description of Related Art

After physical design of a circuit, placement of logic elements and non-uniformity of trigger time may result in non-uniform current distribution on a chip. Conventionally, relevant analysis is performed through design assistance software during a post-layout stage of circuit design. Since a peak current of a bump current source determines a degree of voltage drop of a resistor, it may be difficult to add, remove, or change locations of bump current sources during this design stage. In addition, power consumption analysis and improvement for the circuit tend to consume an amount of time during the post-layout stage, reducing efficiency in the circuit design.

SUMMARY

The disclosure provides a chip power consumption analyzer and an analysis method thereof that reduce time for a chip design cycle.

According to an embodiment of the disclosure, an analysis method of chip power consumption includes the following. Design information of a circuit is received. A plurality of clock arriving times of a plurality of circuit cells in the circuit are calculated based on the design information, and a base cell type is set among a plurality of cell types corresponding to the circuit cells according to the clock arriving times. Base demand current information of the base cell type is established, and a plurality of demand current information of a plurality of other cell types not being the base cell type is obtained. A plurality of demand peak currents of a plurality of corresponding bump current sources are predicted according to the demand current information, the base demand current information, and a plurality of position information.

According to an embodiment of the disclosure, a chip power consumption analyzer includes a memory and a controller. The controller is coupled to the memory. The controller is configured to receive design information of a circuit; calculate a plurality of clock arriving times of a plurality of circuit cells in the circuit based on the design information, and set a base cell type among a plurality of cell types corresponding to the circuit cells according to the clock arriving times; establish base demand current information of the base cell type, and obtain a plurality of demand current information of a plurality of other cell types not being the base cell type; and predict a plurality of demand peak currents of a plurality of corresponding bump current sources according to the demand current information, the base demand current information, and a plurality of position information.

Based on the foregoing, according to the embodiments of the disclosure, the bump current source is disposed for the demand current information and the position information of the plurality of circuit cells in the circuit. The current peak may be predicted during the early design stage by analyzing risky regions regarding the current demand in the circuit, effectively reducing the time for the chip design cycle.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 4 is a schematic diagram showing type analysis results of circuit cells according to an embodiment of the disclosure.

FIG. 5 is a schematic diagram showing relationship between peak currents of cell types according to an embodiment of the disclosure.

FIG. 8 is a schematic diagram showing prediction of demand peak currents according to an embodiment of the disclosure.

DESCRIPTION OF THE EMBODIMENTS

Figure 1:
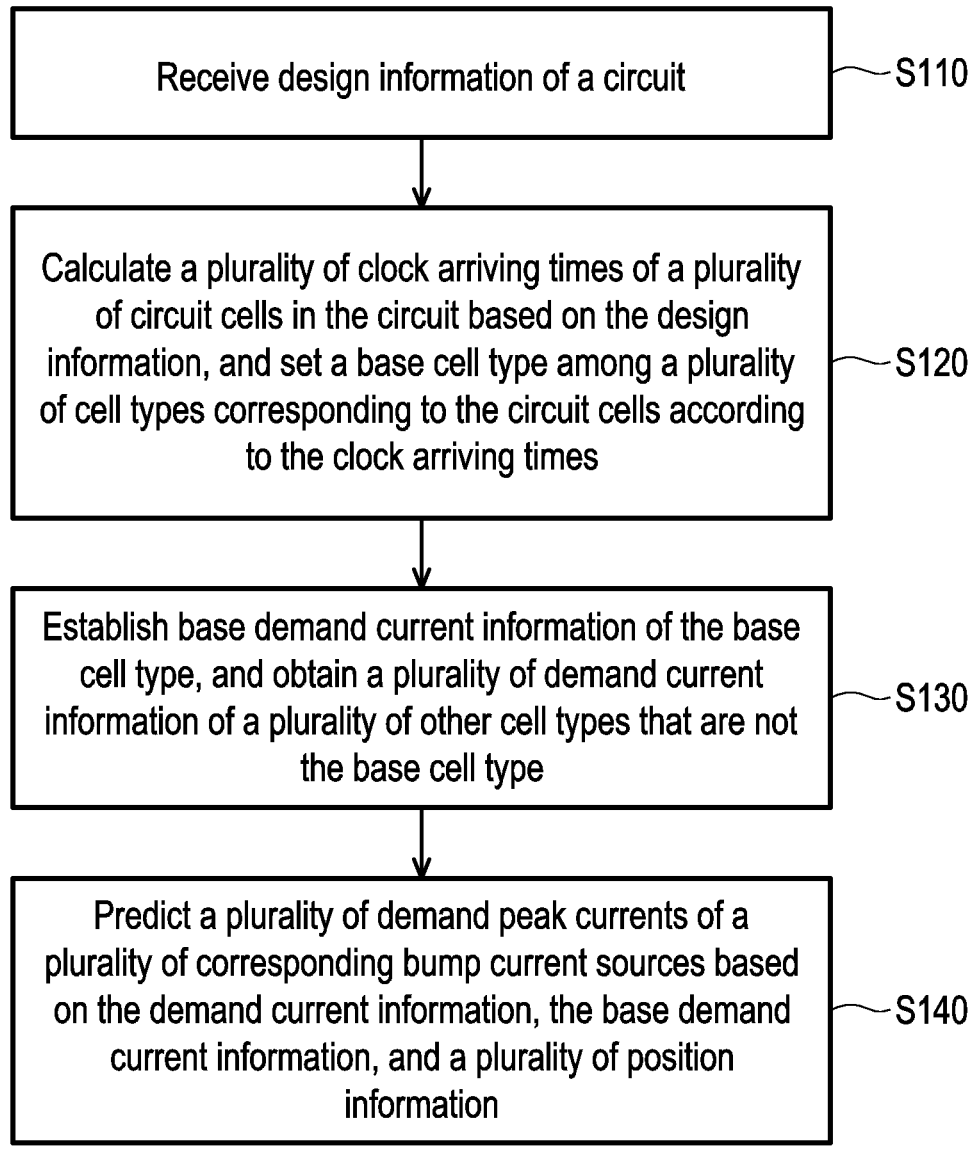
FIG. 1 is a flowchart of an analysis method of chip power consumption according to an embodiment of the disclosure.

With reference to FIG. 1, FIG. 1 is a flowchart of an analysis method of chip power consumption according to an embodiment of the disclosure. This embodiment is directed to a pseudo-analysis method of chip power consumption for predicting current demand information of a plurality of circuit cells in a circuit. In step S110, design information of a circuit is received. Here, the design information of the circuit may be the circuit layout information generated during the early design of the circuit. Next, in step S120, a plurality of clock arriving times of a plurality of circuit cells in the circuit are calculated based on the received design information, and a base cell type is set among a plurality of cell types corresponding to the circuit cells according to the clock arriving times. Here, the circuit cells in step S120 may be a plurality of temporary registers in the circuit. The corresponding clock arriving time may be the time when the register is triggered according to the received clock signal.

To save the time for analysis, in this embodiment, not all of the circuit cells are analyzed, and some of the circuit cells may be selected for analysis according to a distribution status of the clock arriving times. The relevant specifics will be described in detail in the following embodiments.

In step S120, the plurality of cell types in the circuit are also classified. The circuit cells, such as registers, in the circuit may have many different types. The circuit cells may be classified according to threshold voltages, driving capabilities, and numbers of bits of signals that can be processed, and a look-up table may be established according to the classification result. The look-up table may record statistical quantities of the circuit cells corresponding to different cell types.

In step S120, one of the plurality of cell types may be selected as the base cell type according to the statistical quantities. For example, the cell type having the greatest statistical quantity among the plurality of cell types may be set as the base cell type.

Next, in step S130, a peak current of the demand currents of the base cell type may be calculated, and base demand current information of the base cell type may be established. In addition, a plurality of peak currents of other cell types that are not the base cell type may be obtained through simulation to obtain demand current information of other cell types. In step S130, a plurality of peak current ratios between the peak current of the base cell type and the plurality of peak currents of the non-base cell types are calculated, and the peak current ratios are recorded in another look-up table.

In step S130 of this embodiment, dynamic modeling of the demand currents is performed, and the base demand current information may be completed through simulation. Moreover, after the base demand current information is obtained, the demand current information of the circuit cells in all circuit types may be further obtained according to the peak current ratios.

In step S140, a plurality of demand peak currents of a plurality of corresponding bump current sources may be predicted according to the demand current information, the base demand current information, and a plurality of position information of the cell types of the circuit cells. The peak currents to be supplied by the plurality of bump current sources may be calculated according to distances between the circuit cells and the bump current sources, and the demand current information of the circuit cells. Accordingly, current outputs of the bump current sources can be predetermined, information of the peak currents for bump positions can be provided to the designer, and the design structure of the circuit can be adjusted to optimize the power supply design of the circuit.

Figure 2:
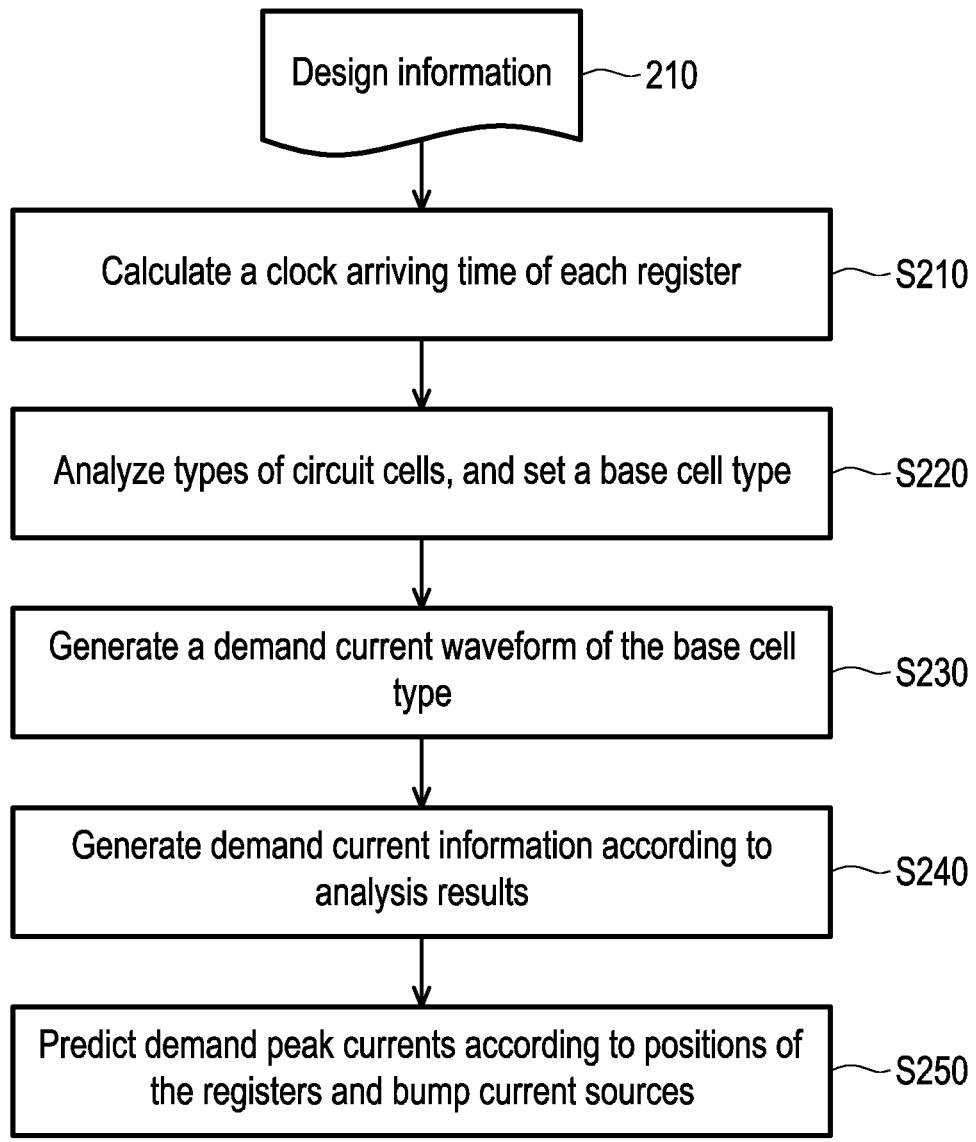
FIG. 2 is a flowchart of an analysis method of chip power consumption according to another embodiment of the disclosure.

Then, with reference to FIG. 2, FIG. 2 is a flowchart of an analysis method of chip power consumption according to another embodiment of the disclosure. In step S210, clock arriving times of registers in a circuit are calculated based on design information 210 of the circuit. In this embodiment, in step S210, circuit cells having the same clock arriving time may also be calculated and a plurality of statistical quantities may be generated. Here, reference may be made to FIG. 3, which is a graph showing correspondence between clock arriving times and statistical quantities according to an embodiment of the disclosure.

Figure 3:
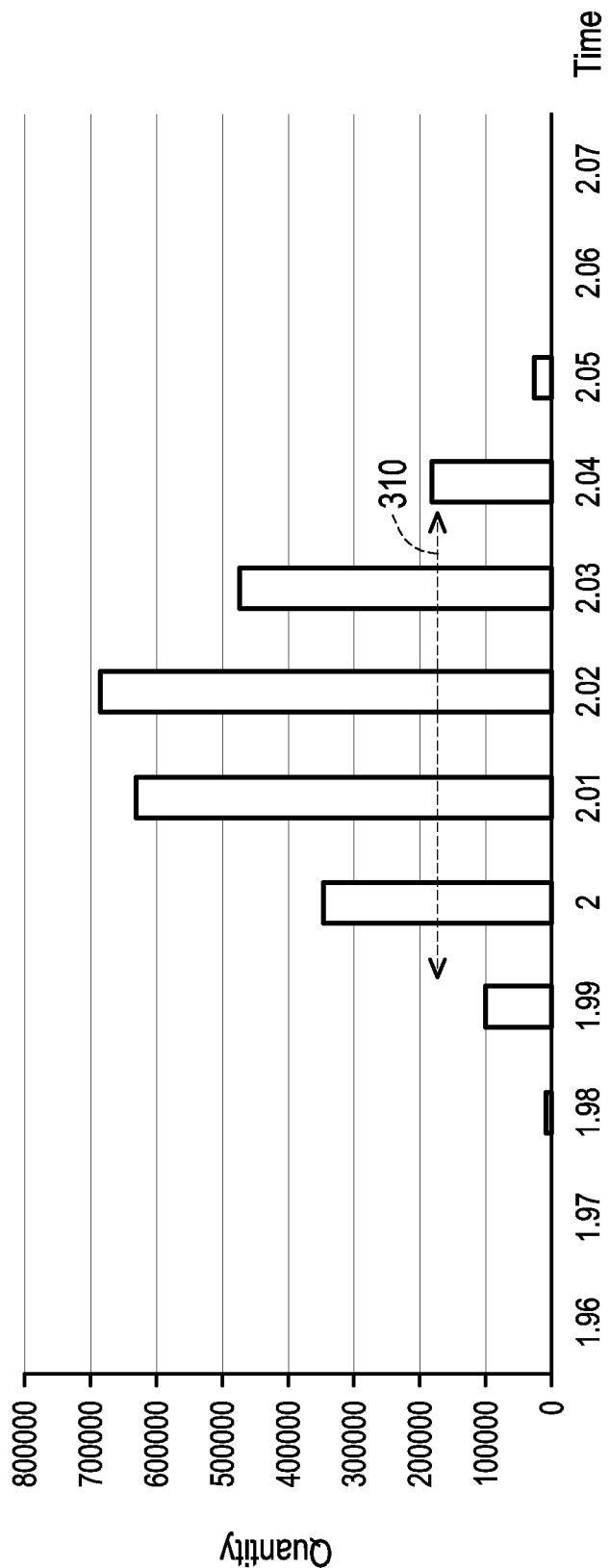
FIG. 3 is a graph showing correspondence between clock arriving times and statistical quantities according to an embodiment of the disclosure.

In FIG. 3, a plurality of different statistical quantities correspond to different clock arriving times. The clock arriving times may be in a distribution range from 1.98 nanoseconds to 2.05 nanoseconds. Here, the designer may determine a selected range 310 (e.g., from 2.0 nanoseconds to 2.03 nanoseconds) in the distribution range of the clock arriving times, and analyze types of the circuit cells in the selected range 310. As such, in the analysis method of chip power consumption of this embodiment, it is not required to analyze all circuit cells, effectively improving the accuracy and reduce the time for the analysis.

In the physical design, when arrangement of components is completed during the circuit design, a clock deviation value may first be defined as a basis to accordingly observe all the registers for obtaining the clock arriving times of the registers. When synthesis of timing trees is completed during the circuit design, timing analysis may be performed to know the clock arriving time of each of the registers.

With reference to FIG. 2 again, in step S220, the types of the circuit cells in the selected range 310 may be analyzed, and a base cell type may be set according to the analysis result. In step S220, the number of circuit cells corresponding to different cell types in the circuit may be calculated. In this embodiment, the classification of cell types may be divided according to threshold voltages, driving capabilities, and numbers of bits of the circuit cells. Here, reference may be made to FIG. 4, which is a schematic diagram showing type analysis results of circuit cells according to an embodiment of the disclosure. In FIG. 4, the circuit cells may be divided into a plurality of levels, for example, 1, 2, 4, 6, and 8 according to the driving capabilities, and may be divided into two groups, for example, a low threshold voltage (a first threshold voltage) and a high threshold voltage (a second threshold voltage) according to the threshold voltages. The numbers of bits of signals that can be processed by the circuit cells may be single-bit and multi-bit, and the multi-bit may be divided into 2, 4, 6, and 8 bits.

Through type analysis of the circuit cells, the numbers corresponding to the different cell types in the circuit may be calculated and established in a look-up table. In this embodiment, information of the look-up table may be stored in any form of memory without particular limitations.

Next, according to the analysis result of FIG. 4, the designer may set one of the plurality of cell types as the base cell type. For example, the designer may choose a cell type having a relatively high (not necessarily the highest) statistical quantity (e.g., field 410) among the plurality of cell types, namely the single-bit cell type having the driving capability of 1 and the first threshold voltage, as the base cell type.

Next, with reference to FIG. 5, FIG. 5 is a schematic diagram showing relationship between peak currents of cell types according to an embodiment of the disclosure. After the base cell type is set, peak current ratios between the base cell type and other cell types may be calculated through simulation, and the peak current ratios may be recorded. In this embodiment, the simulation may be performed based on a simulation condition, and the simulation conditions may include the skew of the input signals, the delay of the circuit cells, the load of the output, and the fan-out of the circuit cells.

In FIG. 5, the peak currents of the cell types may be analyzed respectively for the demand currents of a clock signal CP and an output signal Q. In this embodiment, the cell type of type 1 that is single-bit and has the first threshold voltage is set as the base cell type. The ratios between the peak currents of the other cell types and the peak current of the base cell type may be calculated through the simulation, and may be recorded in any form of memory.

With reference to FIG. 2 again, after the proportional relationship between the peak currents of the cell types is established, step S230 may be performed and generate demand current information of the base cell type. In step S230, the dynamic model of the demand current, namely the current waveform of the demand current, of the base cell type may be generated according to a predetermined simulation condition. Here, the demand current of the base cell type may be analyzed according to the demand currents of the clock signal and the output signal of the register, and of the combinational logic circuit. The demanded currents of the clock signal and the output signal are generated from the transition of the clock signal and the output signal, and the demanded current of the combinational logic circuit is the current required for the operation of the combinational logic circuit.

Figure 6A:
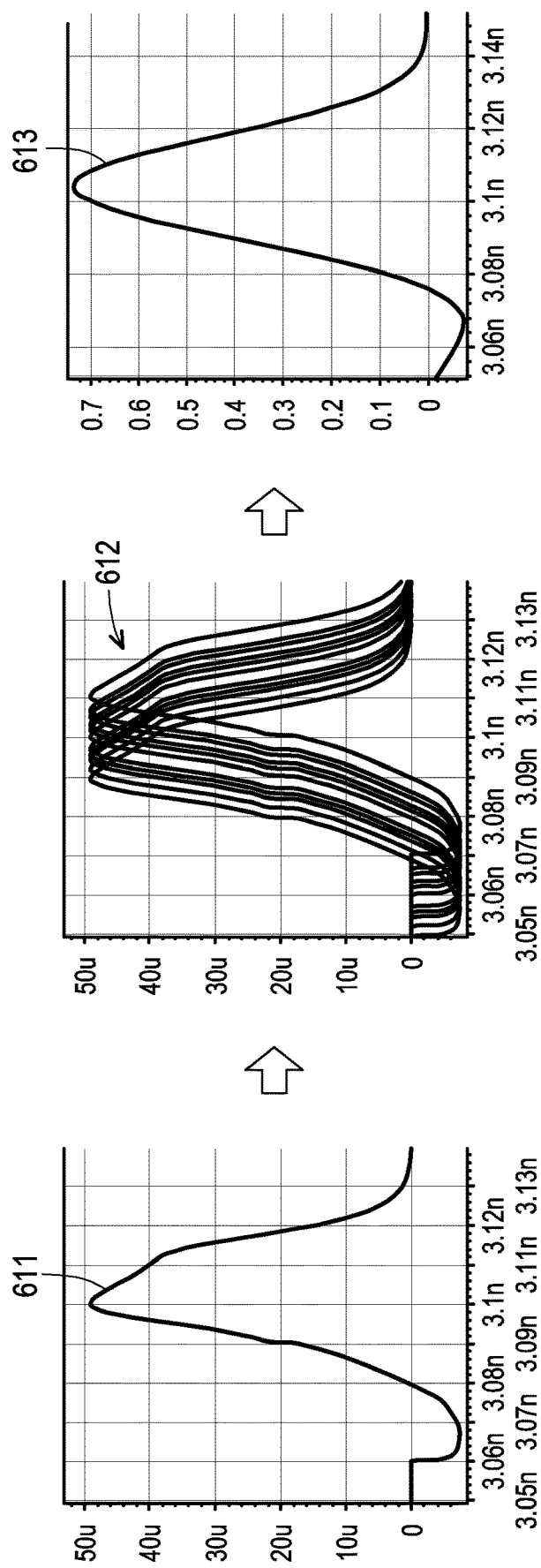
FIG. 6A to FIG. 6D are schematic diagrams showing generation of demand current information of a base cell type according to an embodiment of the disclosure.

Then, with reference to FIG. 6A to FIG. 6D, FIG. 6A to FIG. 6D are schematic diagrams showing generation of demand current information of a base cell type according to an embodiment of the disclosure. In FIG. 6A, a demand current waveform 611 corresponding to the clock signal in the base cell type may be generated through simulation. Next, a plurality of demand current waveforms 612 are established through a Gaussian distribution according to the demand current waveform 611. A demand current waveform 613 may be obtained by combining the demand current waveforms 612.

Figure 6B:
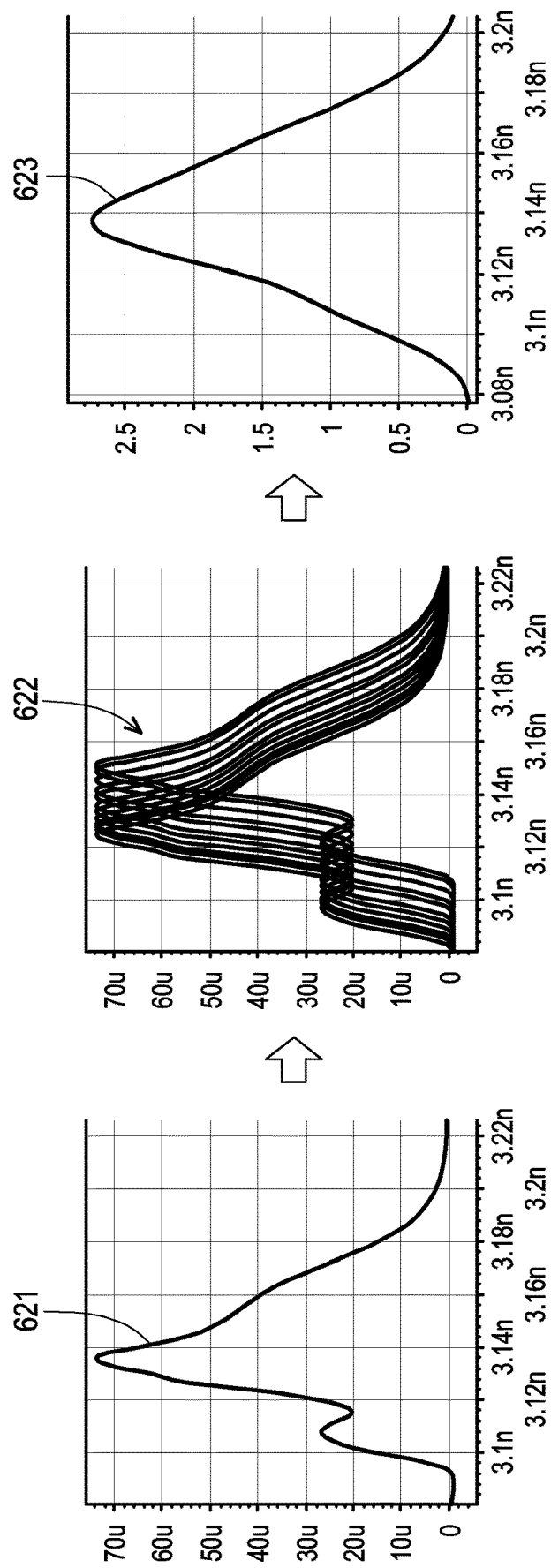

In FIG. 6B, a demand current waveform 621 corresponding to the output signal in the base cell type may be generated through simulation. Next, a plurality of demand current waveforms 622 are established through a Gaussian distribution according to the demand current waveform 621. A demand current waveform 623 may be obtained by combining the demand current waveforms 622.

Figure 6C:
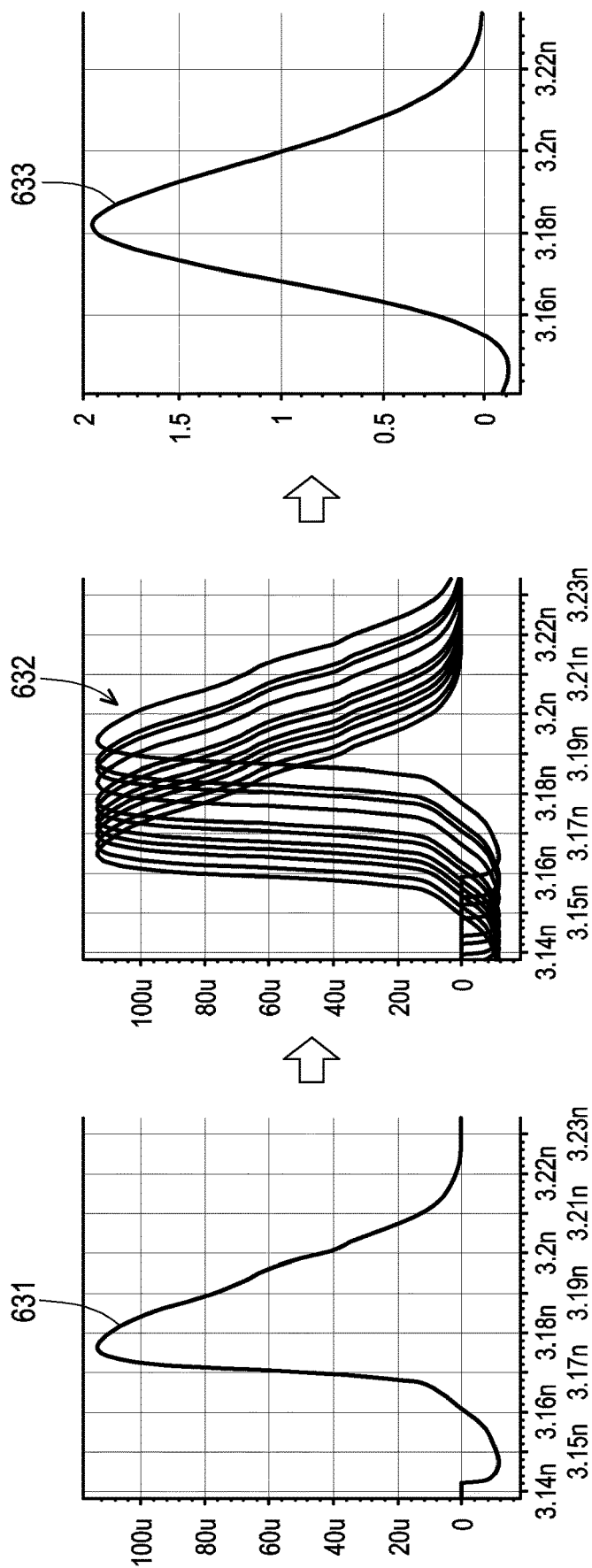

In FIG. 6C, a demand current waveform 631 corresponding to the combinational logic circuit in the base cell type may be generated through simulation. Next, a plurality of demand current waveforms 632 are established through a Gaussian distribution according to the demand current waveform 631. A demand current waveform 633 may be obtained by combining the demand current waveforms 632.

Figure 6D:
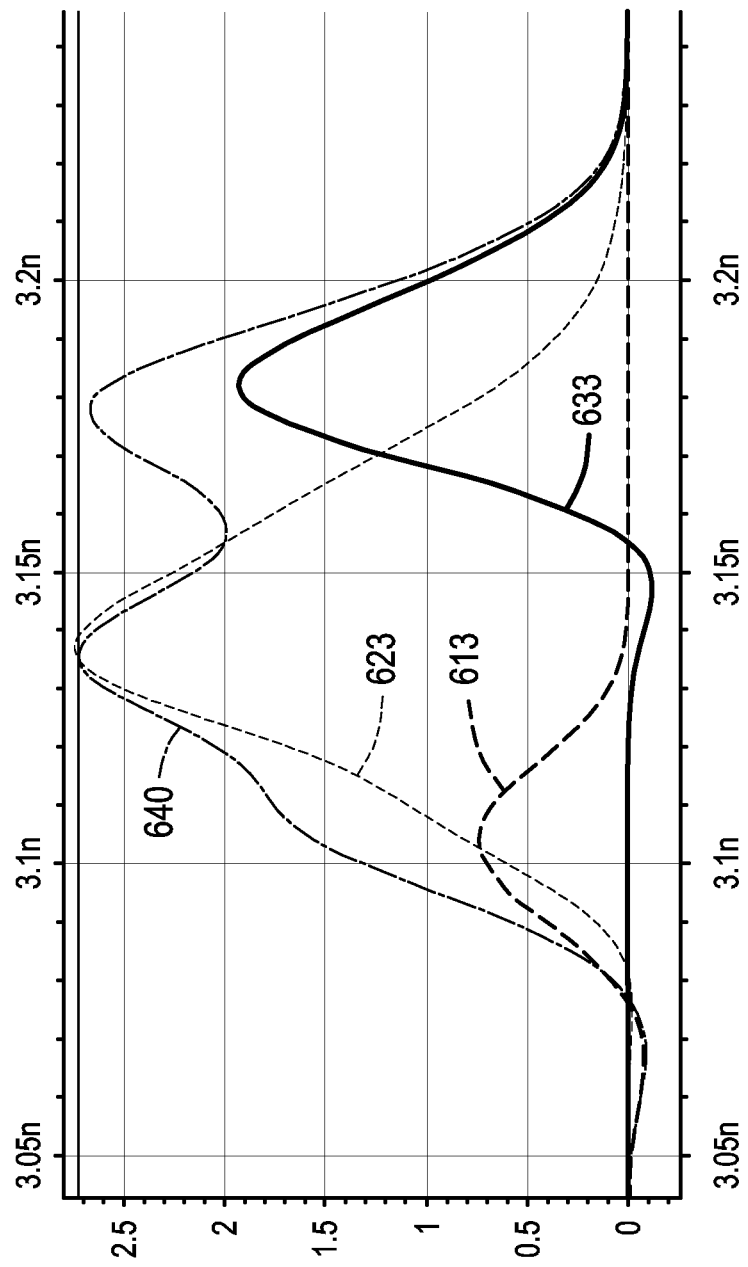

In FIG. 6D, the demand current waveforms 613, 623, and 633 may be added, and a demand current waveform 640 may be generated. Moreover, the demand current information of the base cell type may be obtained by calculating the peak current in the demand current waveform 640.

With reference to FIG. 2 again, after step S240 is completed, in step S250, a demand peak current of each bump current source may be predicted according to positions of the registers and the bump current sources in the circuit. To be specific, reference may be made to FIG. 7, which is a schematic diagram showing prediction of demand peak currents of bump current sources according to an embodiment of the disclosure.

Figure 7:
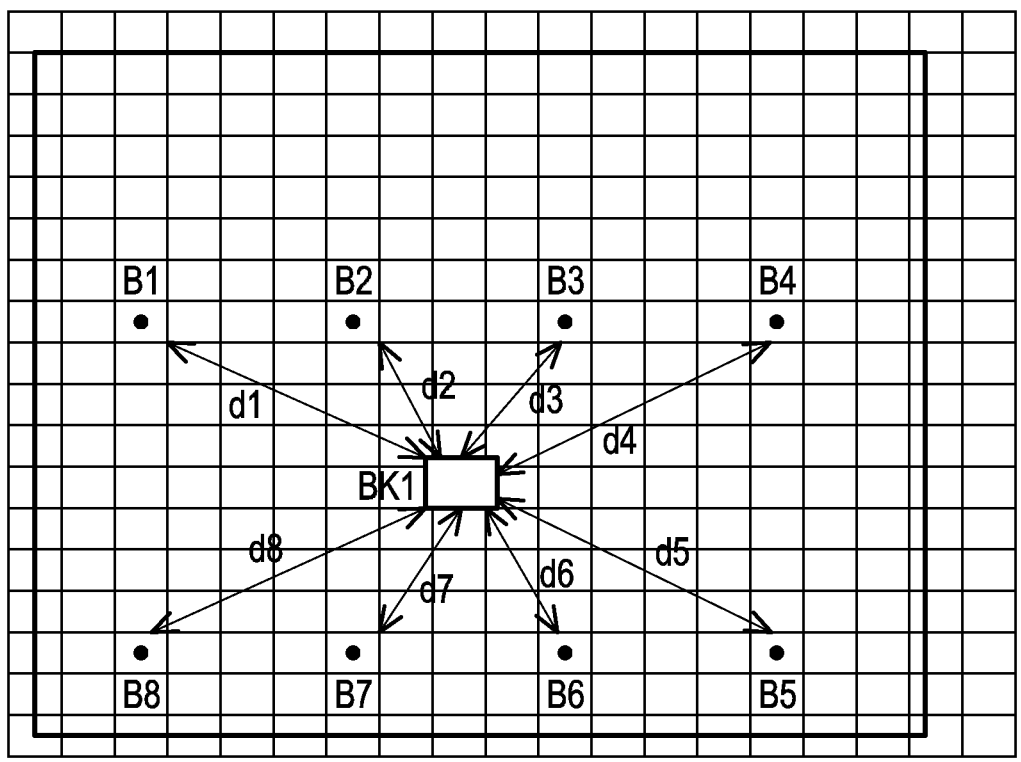
FIG. 7 is a schematic diagram showing prediction of demand peak currents of bump current sources according to an embodiment of the disclosure.

In FIG. 7, the circuit 700 may be divided into a plurality of circuit blocks. Taking a circuit block BK1 as an example, in step S250, the circuit cells in the circuit block BK1 may be analyzed, and a weight value may be calculated according to the peak current ratios among the circuit cells and the base cell type. For example, according to FIG. 5, it assumed that the circuit block BK1 has circuit cells of type 2 and type 7, the circuit cell of type 2 has the second threshold voltage, and the circuit cell of type 7 has the first threshold voltage. Then, corresponding to the demand current of the output signal Q, the weight value of the circuit block BK1 may be equal to 2.24+2.12=3.36.

In addition, in step S250, distances between the circuit block BK1 and a plurality of bump current sources B1 to B8 may also be calculated. Further, a plurality of register densities of the bump current sources B1 to B8 may be calculated according to a plurality of distances d1 to d8 between the circuit block BK1 and the bump current sources B1 to B8.

To be specific, the plurality of distances d1 to d8 between the circuit block BK1 and the bump current sources B1 to B8 and a sum ds thereof may first be calculated. Next, the register density for each of the bump current sources B1 to B8 may be calculated according to the sum ds and the corresponding distances d1 to d8. Taking the bump current source B1 as an example, the distance d1 between the circuit block BK1 and the bump current source B1 and a distance (pitch) pd between center points of two adjacent circuit blocks may first be compared. When the distance d1 is not greater than the distance pd, a first value corresponding to the bump current source B1 may be set as equal to the reciprocal of the distance pd divided by the distance d1. When the distance d1 is greater than the distance pd, the first value corresponding to the bump current source B1 may be set as equal to the reciprocal of the square of the distance pd divided by the distance d1. Next, operations may be performed between the bump current source B1 and the remaining circuit blocks, and the first values obtained from all the operations are added to obtain the weighted value of the bump current source B1.

Moreover, the operation described above may be performed for all of the bump current sources B1 to B8, and a plurality of weighted values corresponding to the bump current sources B1 to B8 may be obtained. By adding the plurality of weighted values to generate a sum of weighted values, and dividing the plurality of weighted values corresponding to the bump current sources B1 to B8 by the sum of weighted values, the plurality of register densities of the bump current sources B1 to B8 may be generated.

According to the weight value and register density generated in the above description, the demand peak current of each bump current source corresponding to each circuit block can be predicted. Here, reference may be made to FIG. 8, which is a schematic diagram showing prediction of demand peak currents according to an embodiment of the disclosure. In FIG. 8, the calculated register densities of the plurality of bump current sources B1 to B6 may be recorded in a look-up table. In addition, the predicted demand peak current corresponding to each of the bump current sources B1 to B6 in the circuit block may be generated corresponding to demand current information at different toggle rates, for example 50%, 33%, or 25%. Taking a circuit block corresponding to the bump current source B1 at a toggle rate of 50% as an example, the predicted demand peak current corresponding to the bump current source B1 may be equal to 0.1791 multiplied by 3.6533 which equals 0.654.

In circuit design, the demand peak current of the bump current source may be predicted through the above-mentioned calculation. The designer may adjust the circuit architecture, the conversion rate, and/or the bump current sources according to the predicted demand peak current obtained from the analysis to optimize the performance of the circuit.

Figure 9:
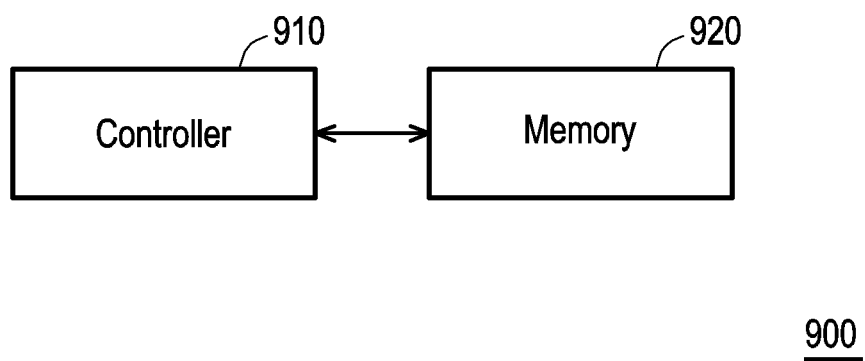
FIG. 9 is a schematic view of a chip power consumption analyzer according to an embodiment of the disclosure.

With reference to FIG. 9 below, FIG. 9 is a schematic view of a chip power consumption analyzer according to an embodiment of the disclosure. A chip power consumption analyzer 900 includes a controller 910 and memory 920. The controller 910 and the memory 920 are coupled to each other. The controller 910 receives design information of a circuit, and analyzes chip power consumption based on the design information as described in the embodiments of FIG. 1 and FIG. 2 to predict demand peak currents of bump current sources.

The specifics of the embodiments of FIG. 1 and FIG. 2 have been described in detail in the embodiments above, and will not be repeatedly described here. In this embodiment, the memory 920 may be a memory circuit in any form, and may serve as a medium recording various pieces of information as generated in the embodiments of FIG. 3 to FIG. 8. The controller 910 may be a hardware circuit that is designed through a hardware description language (HDL) or any other digital circuit design known to those skilled in the related fields, and realized through a field programmable gate array (FPGA), a complex programmable logic device (CPLD), or an application-specific integrated circuit (ASIC).

In summary of the foregoing, in the analysis method of chip power consumption according to the embodiments of the disclosure, by effectively predicting the peak currents of the bump current sources on package nodes according to the specifications and physical design information, circuit design planning is conducted and improved during the early design stage, reducing the design cycle, manpower, and planning schedule, and effectively improving the efficiency in the circuit design.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An analysis method of chip power consumption, comprising:
   receiving design information of a circuit;
   calculating a plurality of clock arriving times of a plurality of circuit cells having a plurality of cell types in the circuit based on the design information, and setting a base cell type among the cell types to one of the cell types corresponding to a part of the circuit cells which has a relatively high number in comparison with other cell types of the cell types according to the clock arriving times;
   establishing base demand current information of the base cell type, and obtaining a plurality of demand current information of the other cell types not being the base cell type; and
   predicting a plurality of demand peak currents of a plurality of corresponding bump current sources according to the demand current information, the base demand current information, and a plurality of position information.

2. The analysis method according to claim 1, wherein calculating the clock arriving times of the circuit cells in the circuit based on the design information, and setting the base cell type among the cell types corresponding to the circuit cells according to the clock arriving times comprises:
   calculating a plurality of first statistical quantities of the circuit cells having a same clock arriving time, wherein the first statistical quantities are numbers of different parts of the circuit cells respectively corresponding to different clock arriving times;
   obtaining a selected range according to a distribution range of the clock arriving times and the first statistical quantities;
   analyzing types of the circuit cells in the selected range, and calculating a plurality of second statistical quantities of the circuit cells corresponding to different cell types, wherein the second statistical quantities are numbers of different parts of the circuit cells respectively corresponding to the different cell types; and
   selecting one of the cell types as the base cell type according to the second statistical quantities.

3. The analysis method according to claim 2, further comprising:
   dividing the cell types according to threshold voltages, driving capabilities, and numbers of bits of the circuit cells.

4. The analysis method according to claim 2, further comprising:
   calculating a plurality of peak current ratios between the other cell types and the base cell type.

5. The analysis method according to claim 1, wherein establishing the base demand current information of the base cell type comprises:
   analyzing first demand current information of the base cell type according to a simulation condition;
   establishing a plurality of second demand current information through a Gaussian distribution according to the first demand current information; and
   integrating the second demand current information to generate the base demand current information.

6. The analysis method according to claim 1, wherein predicting the demand peak currents of the corresponding bump current sources according to the demand current information, the base demand current information, and the position information comprises:
   dividing the circuit into a plurality of circuit blocks;
   calculating a weight value according to the current peak ratios corresponding to the circuit cells in each of the circuit blocks;
   calculating a plurality of register densities of the bump current sources according to a plurality of distances between the circuit blocks and the bump current sources; and
   predicting the demand peak currents according to the register densities and the weight values corresponding to the circuit blocks.

7. A chip power consumption analyzer comprising:
   memory; and
   a controller coupled to the memory, the controller configured to:
     receive design information of a circuit;
     calculate a plurality of clock arriving times of a plurality of circuit cells having a plurality of cell types in the circuit based on the design information, and set a base cell type among the cell types to one of the cell types corresponding to a part of the circuit cells which has a relatively high number in comparison with other cell types of the cell types according to the clock arriving times;
     establish base demand current information of the base cell type, and obtain a plurality of demand current information of the other cell types not being the base cell type; and
     predict a plurality of demand peak currents of a plurality of corresponding bump current sources according to the demand current information, the base demand current information, and a plurality of position information.

8. The analyzer according to claim 7, wherein the controller is further configured to:

calculate a plurality of first statistical quantities of the circuit cells having a same clock arriving time, wherein the first statistical quantities are numbers of different parts of the circuit cells respectively corresponding to different clock arriving times;

obtain a selected range according to a distribution range of the clock arriving times and the first statistical quantities;

analyze types of the circuit cells in the selected range, and calculate a plurality of second statistical quantities of the circuit cells corresponding to different cell types, wherein the second statistical quantities are numbers of different parts of the circuit cells respectively corresponding to the different cell types; and select one of the cell types as the base cell type according to the second statistical quantities.

9. The analyzer according to claim 8, wherein the controller is further configured to divide the cell types according to threshold voltages, driving capabilities, and numbers of bits of the circuit cells.

10. The analyzer according to claim 8, wherein the controller is further configured to calculate a plurality of peak current ratios between the other cell types and the base cell type.

11. The analyzer according to claim 7, wherein the controller is further configured to:

analyze first demand current information of the base cell type according to a simulation condition;

establishing a plurality of second demand current information through a Gaussian distribution according to the first demand current information; and integrate the second demand current information to generate the base demand current information.

12. The analyzer according to claim 7, wherein the controller is further configured to:

divide the circuit into a plurality of circuit blocks;

calculate a weight value according to the current peak ratios corresponding to the circuit cells in each of the circuit blocks;

calculate a plurality of register densities of the bump current sources according to a plurality of distances between the circuit blocks and the bump current sources; and predict the demand peak currents according to the register densities and the weight values corresponding to the circuit blocks.

* * * * *